US012186771B2

(12) United States Patent
Thiede et al.

(10) Patent No.: US 12,186,771 B2
(45) Date of Patent: Jan. 7, 2025

(54) FOAM PUMP UTILIZING A COMPRESSION SPRING ASSEMBLY

(71) Applicant: SILGAN DISPENSING SYSTEMS CORPORATION, Grandview, MO (US)

(72) Inventors: Stephan Thiede, Waalwijk (DE); Marc Tepas, Alkmaar (NL)

(73) Assignee: SILGAN DISPENSING SYSTEMS CORPORATION

( * ) Notice: Subject to any disclaimer, the term of this patent is extended or adjusted under 35 U.S.C. 154(b) by 59 days.

(21) Appl. No.: 18/100,856

(22) Filed: Jan. 24, 2023

(65) Prior Publication Data

US 2024/0246097 A1 Jul. 25, 2024

(51) Int. Cl.
*B05B 7/00* (2006.01)
*A47K 5/14* (2006.01)
*B05B 11/10* (2023.01)

(52) U.S. Cl.
CPC .............. *B05B 7/0062* (2013.01); *A47K 5/14* (2013.01); *B05B 11/1014* (2023.01); *B05B 11/105* (2023.01); *B05B 11/1087* (2023.01)

(58) Field of Classification Search
CPC . B05B 7/0062; B05B 11/1014; B05B 11/105; B05B 11/1087; A47K 5/14
See application file for complete search history.

(56) References Cited

U.S. PATENT DOCUMENTS 8,360,283 B1 * 1/2013 Tu ........................ B01F 25/4523 222/190
9,868,128 B2 1/2018 Tepas et al.
10,150,127 B2 12/2018 Tepas et al.
10,473,176 B2 11/2019 Deman et al.
2001/0042761 A1 * 11/2001 Ophardt .............. B05B 11/1087 222/145.6
2002/0070238 A1 * 6/2002 Pritchett ............... B05B 7/0037 222/189.11
2004/0084481 A1 * 5/2004 Foster ................... B05B 7/0031 222/321.9
2011/0036869 A1 * 2/2011 Arminak ............. B05B 11/1087 222/190
2022/0280962 A1 * 9/2022 Ma ........................ B01F 23/235

FOREIGN PATENT DOCUMENTS

JP 08318966 A * 12/1996 ......... B05B 11/3001
JP 2006291809 A * 10/2006

* cited by examiner

*Primary Examiner* — Bob Zadeh

(57) ABSTRACT

A foam dispenser utilizing components made from the same or similar materials that can be recycled in a single recycling process or stream includes a plastic spring system acting on spring cones formed in a piston rod and an accumulator, an air valve having multiple flanges to facilitate the flow of air into and out of the foam dispenser, and a liquid piston configured to improve the control of liquid flow through the foam dispenser and which is more easily manufactured.

18 Claims, 7 Drawing Sheets

FOAM PUMP UTILIZING A COMPRESSION SPRING ASSEMBLY

BACKGROUND OF THE INVENTION

Field of the Invention: Embodiments of the invention relate to a foam pump, or pump that generates a foamed liquid output, including some embodiments utilizing a compression spring assembly.

Description of Related Art: Foam pumps, or pumps used to generate a foamed liquid product through the combination of air and a liquid product in a fluid flow path disrupted by one or more mesh features, are well known and are commonly used with hand soaps, dish soaps, disinfectants, and other cleaning products. Such foam pumps typically include a fluid piston or pump as well as an air piston or pump in which fluid and air pushed by the pumps is mixed in a single flow path and subject to one or more disruptive features, such as a mesh, before exiting an orifice in communication with the fluid and air flow paths. The resulting product produced by the foam pump is a foamed liquid.

Foam pumps may have different configurations and the specifications, or physical characteristics, of such pumps are altered to better generate a foam product based on the intended use, the fluid characteristics, and properties of the formulation being foamed. For example, different mesh sizes may be used or the ratio of air to fluid product being mixed can be altered by the configuration of the pump to create a desired foam product. In many instances, the need for different configurations and requirement to mix the fluid and air products to generate a foam results in many more components being used in the manufacture of a foam pump compared to a regular fluid pump.

While the pump characteristics may be altered to generate alternative foaming qualities and characteristics, further improvements are desired and required to produce better foam consistency and characteristics with fewer parts or parts that can be more easily assembled.

Furthermore, foam pumps are bigger than there fluid pump counterparts, and they use more plastic or material for the same quantity of output as compared to standard fluid pumps. This is in part due to the larger size needed for an air piston or pump to be included with the fluid pump. Such air piston or pump often adds a significant amount of additional material and size to the pump because the ratios of air to liquid are high. Further, the increased number of parts required to mix the air and liquid adds to the total material of the foam pump. While not limiting, the additional material is not necessarily desirable, especially if the foam pump cannot be easily recycled. Many foam pumps cannot be recycled because of the mixture of plastic grades used to form the liquid pump and air pump and the inclusion of metal springs, metal or glass balls for valves, and other materials that cannot be easily recycled in the customary recycle streams. Reducing or limiting the number of different plastic grades and types used in a foam pump—and the elimination of other materials such as glass and metal—is therefore desirable.

Some steps have been taken to reduce the number of different plastic grades and types used in liquid pump manufacturing. In addition, steps have been taken to reduce the use of metal in such pumps. For example, U.S. Pat. No. 10,473,176 discloses, in part, a compression spring assembly and methods of using the same with pumps. The use of such a compression spring assembly in place of a metal spring may be beneficial in that the plastic compression spring may be recycled with the other components of the pump in a single recycle stream. However, further improvements and the reduction of parts is desirable to reduce the variance of materials, lightweight such pumps, and improve the recyclability of foam pumps and foam pump systems.

BRIEF SUMMARY OF THE INVENTION

According to certain embodiments of the invention, a foam pump utilizes a compression spring assembly in place of a metal spring to provide a foam pump that may be easily recycled.

In other embodiments of the invention, a foam pump is formed with a reduced number of parts to minimize the amount of plastic utilized to manufacture the foam pump. In addition, a compression spring assembly is included in place of a metal spring to facilitate recycling of the foam pump in current recycling streams.

According to some embodiments of the invention, a foam pump may include an accumulator defining both a liquid chamber and an air chamber of the foam pump. The accumulator may also include a first cone upon which a compression spring assembly may rest in a non-actuated state and upon which the compression spring assembly may flex during actuation of the foam pump. A piston rod including a second cone sits within an interior space of the accumulator and a liquid piston is attached to the piston rod adjacent the liquid chamber and is seated in an upper portion of the liquid chamber. A fluid flow path is formed in the piston rod and is in communication with a fluid opening that is sealed by the liquid piston when at rest and which is open to an interior of the liquid chamber during actuation of the foam pump. A restrictor is attached to the piston rod at the end opposite the liquid piston. The fluid flow path opens into an interior portion of the restrictor. In some embodiments, the interior portion of the restrictor has a reduced cross-sectional area as compared to the cross-sectional area of the fluid flow path through the liquid piston. The restrictor is also connected to an air piston. The air piston includes an air piston seal seated in the air chamber. Adjacent the connection to the restrictor, the air piston includes a stepped constriction through which liquid flows when exiting the restrictor and into which air is injected from the air chamber as the air piston is moved therein. The stepped constriction decreases in cross-sectional area along the liquid and air fluid flow path. A head connection extending away from the stepped constriction of the air piston connects to a dispenser head having a head fluid flow path therein. Fluid and air passing through the stepped constriction flows into the head fluid flow path. A mesh holder seated in the head fluid flow path further mixes the air and fluid, creating a foam, that flows through the pump head and out an exit orifice therein. The mesh holder may include one or more mesh sections. As an alternative to, or in addition to, one or more mesh sections, other disruptive features and extensions may be present in the mesh holder to create a disruptive mixing of the air and fluid passing therein.

A dispenser head may be attached to the head connection. Actuation of the dispenser head actuates the air piston which in turn actuates the fluid piston. Air flows out of the air chamber through one or more openings in the fluid actuator and into an air valve chamber in which an air valve sits. The air valve includes an inlet air valve which allows air to flow into the air chamber on a return stroke following actuation of the foam dispenser and an outlet air valve that allows air to pass from the air valve chamber into the restrictor and into the stepped constriction during an actuation stroke of the foam dispenser. A compression spring seated between the first cone and second cone is compressed during actuation and returns the pump head, air piston, and fluid piston to the rest state following actuation of the foam dispenser.

The components of embodiments of foam dispensers according to the invention may be made of plastic materials. In some embodiments, the components are all made of a singular plastic material. In other embodiments, the components are made of similar materials that may be placed in the same recycle stream.

BRIEF DESCRIPTION OF THE SEVERAL VIEWS OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

Figure 1:
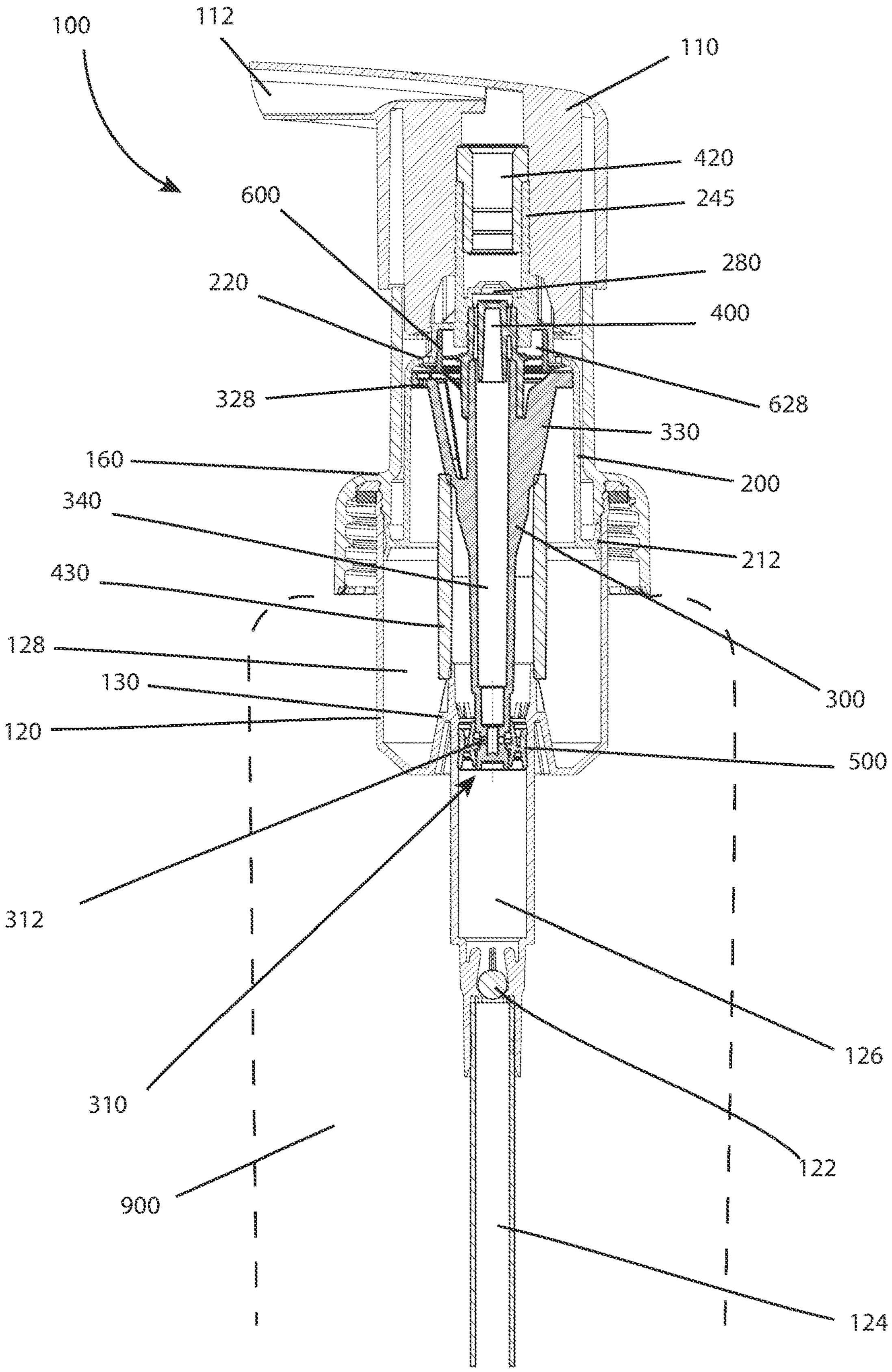
FIG. 1 illustrates a cross-sectional view of a foam dispenser assembly according to various embodiments of the invention.

A foam dispenser 100 according to various embodiments of the invention is illustrated in FIG. 1. The foam dispenser 100 is illustrated in a rest state, or in a position in which a user may begin to actuate the foam dispenser 100 to dispense a product from the dispenser head 110 through the dispenser opening 112.

As illustrated in FIG. 1, a foam dispenser 100 according to various embodiments of the invention may include an accumulator 120 attached to a closure 130 with a dispenser head 110 positioned to move relative to at least a portion of the closure 160 during actuation and return of the dispenser head 110 following actuation.

The foam dispenser 100 may also include an air piston 200, a piston rod 300, a restrictor 400, a mesh holder 420, a spring 430, and a liquid piston 500. The accumulator 120 may also include a liquid feed valve 122 such as a ball valve, flap valve, spider valve, or other such valve configuration. A dip tube 124 may be connected to an end of the accumulator 120 to facilitate flow of fluid from a container 900 into a portion of the foam dispenser 100.

According to various embodiments of the invention, an accumulator 120 includes a liquid chamber 126 and an air chamber 128. An accumulator spring cone 130 is formed in a bottom portion of the air chamber 128 and is positioned between the air chamber 128 and the liquid chamber 126. An opening through the accumulator spring cone 130 extends into the liquid chamber 126. A fluid intake end 310 of the piston rod 300 is attached to the liquid piston 500 which is seated in the opening in the accumulator spring cone 130. The piston rod 300 includes a piston rod spring cone 330 opposite the fluid intake end 310, which is positioned on an interior of the air piston 200. A spring 430 sits between the accumulator spring cone 130 and the piston rod spring cone 330. According to various embodiments of the invention, the spring 430 may be a plastic spring shaped as a cylindrical tube having a longitudinal opening through the wall of the spring. The spring 430 may also be a compression spring having a cylindrical tube shape. In still other embodiments, a spring 430 may be a traditional coil spring. In the case of a compression spring or plastic spring shaped as a cylinder, compression of the piston rod spring cone 330 towards the accumulator spring cone 130 spreads or opens the spring 430, creating a rebound or expansion force that acts on the piston rod spring cone 330 when the actuation force is released, moving the piston rod spring cone 330, and those parts of the foam dispenser 100 attached thereto, away from the accumulator spring cone 130.

Figure 4:
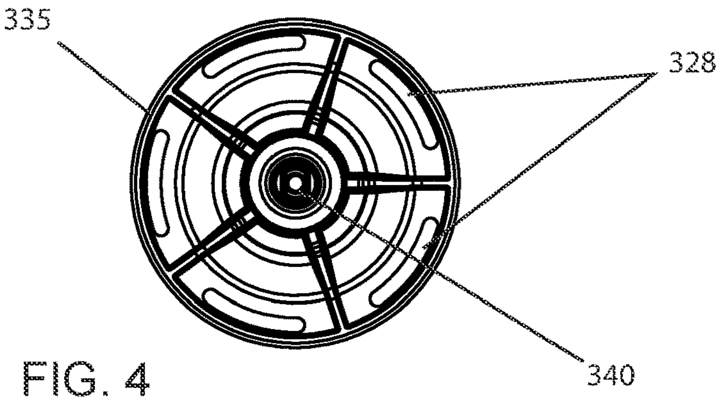
FIG. 4 illustrates a top-down view of the piston rod of FIG. 2.
Figure 2:
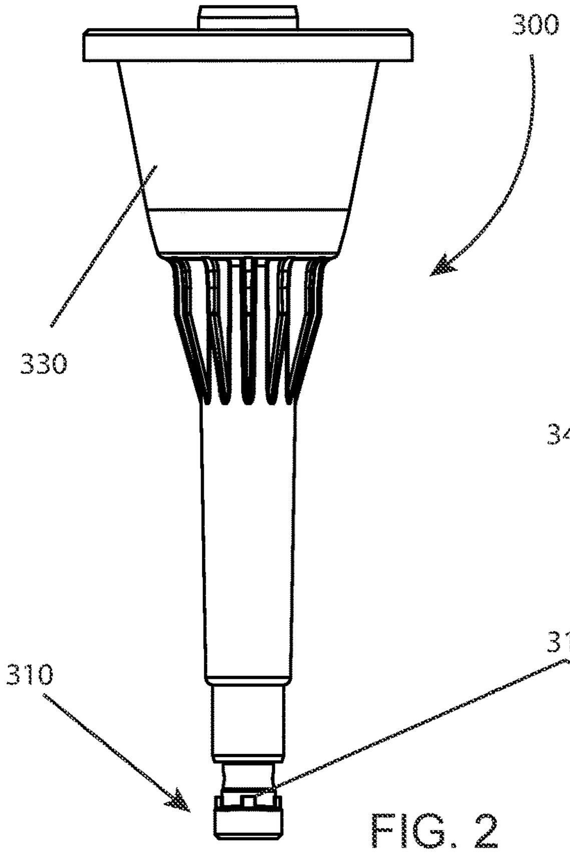
FIG. 2 illustrates a side view of a piston rod according to various embodiments of the invention.
Figure 3:
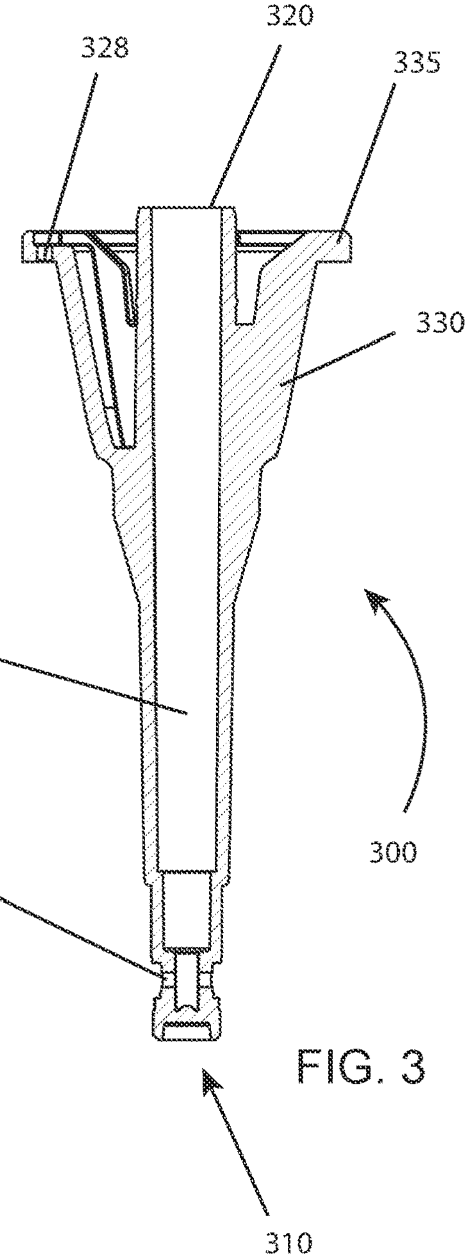
FIG. 3 illustrates a cross-section view of the piston rod of FIG. 2.

FIGS. 2 through 5 illustrate various views of a piston rod 300 according to embodiments of the invention. As illustrated in FIG. 2, a piston rod 300 may include a liquid intake end 310 on one end and a liquid output end 320 on the other end. At least one liquid opening 312 is positioned adjacent the liquid intake end 310 of the piston rod 300. The liquid opening 312 provides a pathway from an exterior of the piston rod 300 to a liquid flow path 340 defined in the interior of the piston rod 300 as shown in FIGS. 3 and 4. In some embodiments, two or more liquid openings 312 may be included in the piston rod 300.

A piston rod spring cone 330 may be defined generally adjacent the liquid output end 320 of the piston rod 300 as illustrated in FIGS. 2 and 3. The piston rod spring cone 330 may extend outward to an outer rim and a flange 335 may extend outwardly from the outer rim of the piston rod spring cone 330. In some embodiments, the flange 335 extends horizontally outward from the outer rim of the piston rod spring cone 330.

According to various embodiments of the invention, the piston rod 300 is connected to the air piston 200 by engagement of the flange 335 with an interior wall of the air piston 200. Movement of the air piston 200 thereby moves the piston rod 300 as well.

The liquid output end 320 of the piston rod 300 includes an opening in communication with the liquid flow path 340. Liquid entering the liquid opening 312 and flowing through the liquid flow path 340 of the piston rod 300 exits the piston rod 300 adjacent the liquid output end 320. According to various embodiments of the invention, a restrictor 400 can be seated in the liquid output end 320 such that the restrictor 400 makes a fluid tight seal with the liquid flow path 340 through the piston rod 300 such that liquid flowing through the piston rod 300 flows into openings in the restrictor 400. A restrictor 400 may be seated in the air piston 200 and one or more restrictor ribs 411 may assist in maintaining the positioning of the restrictor 400.

Figure 5:
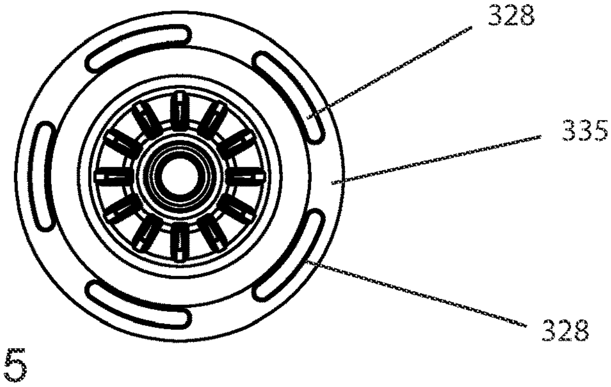
FIG. 5 illustrates a bottom-up view of the piston rod of FIG. 2.
Figure 6:
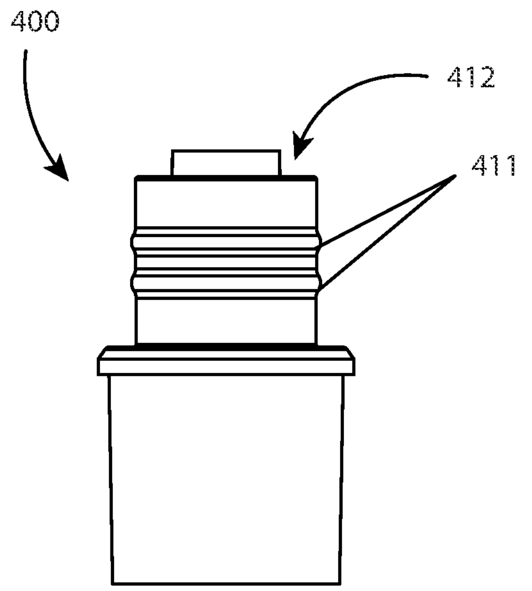
FIG. 6 illustrates a restrictor according to various embodiments of the invention.
Figure 8:
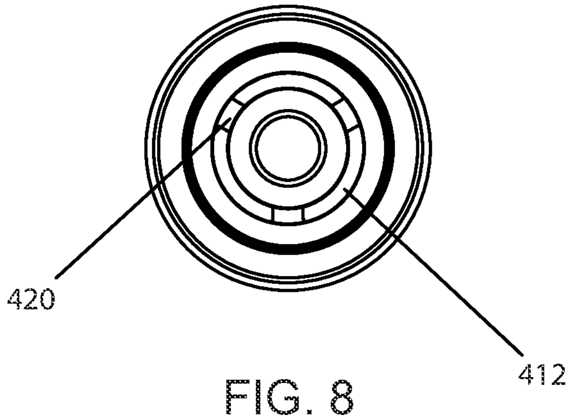
FIG. 8 illustrates a top-down view of the restrictor illustrated in FIG. 6.
Figure 7:
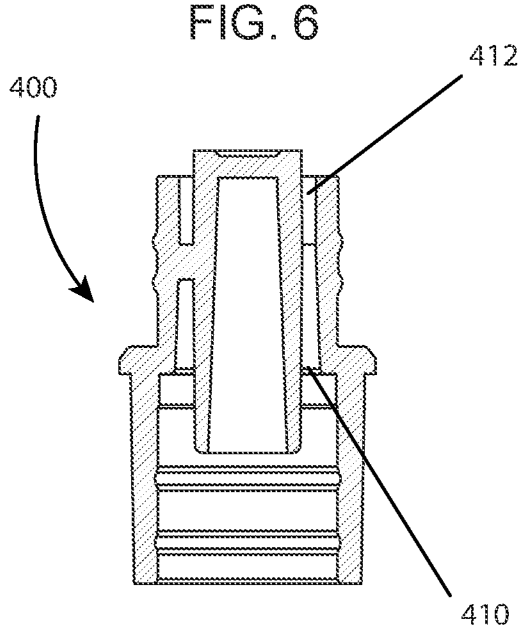
FIG. 7 illustrates a cross-sectional view of the restrictor of FIG. 6.
Figure 9:
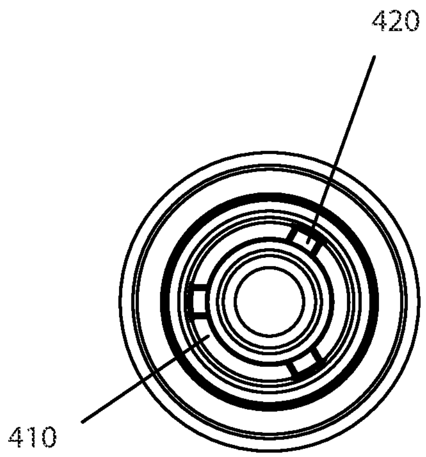
FIG. 9 illustrates a bottom-up view of the restrictor illustrated in FIG. 6.

A piston rod 300 may also include one or more air outlets 328. As illustrated in FIGS. 3, 4, and 5, the one or more air outlets may include passageways through the flange 335. The one or more air outlets 328 allow air to pass from the space within the air chamber 128 and interior of the air piston 200 walls through the flange 335 of the piston rod 300 and into an air flow chamber 628.

A restrictor 400 according to various embodiments of the invention is illustrated in FIGS. 6 through 9. A restrictor 400 includes at least one restrictor liquid inlet 410 configured to accept fluid exiting the liquid output end 320 of the piston rod 300. Liquid passing into the restrictor liquid inlet 410 flows through the restrictor 400 and exits at a restrictor liquid outlet 412. The air and liquid streams begin a mixing process of the air and the liquid as the liquid passes out of the restrictor 400 and into the air piston constriction 280 area.

Figure 10:
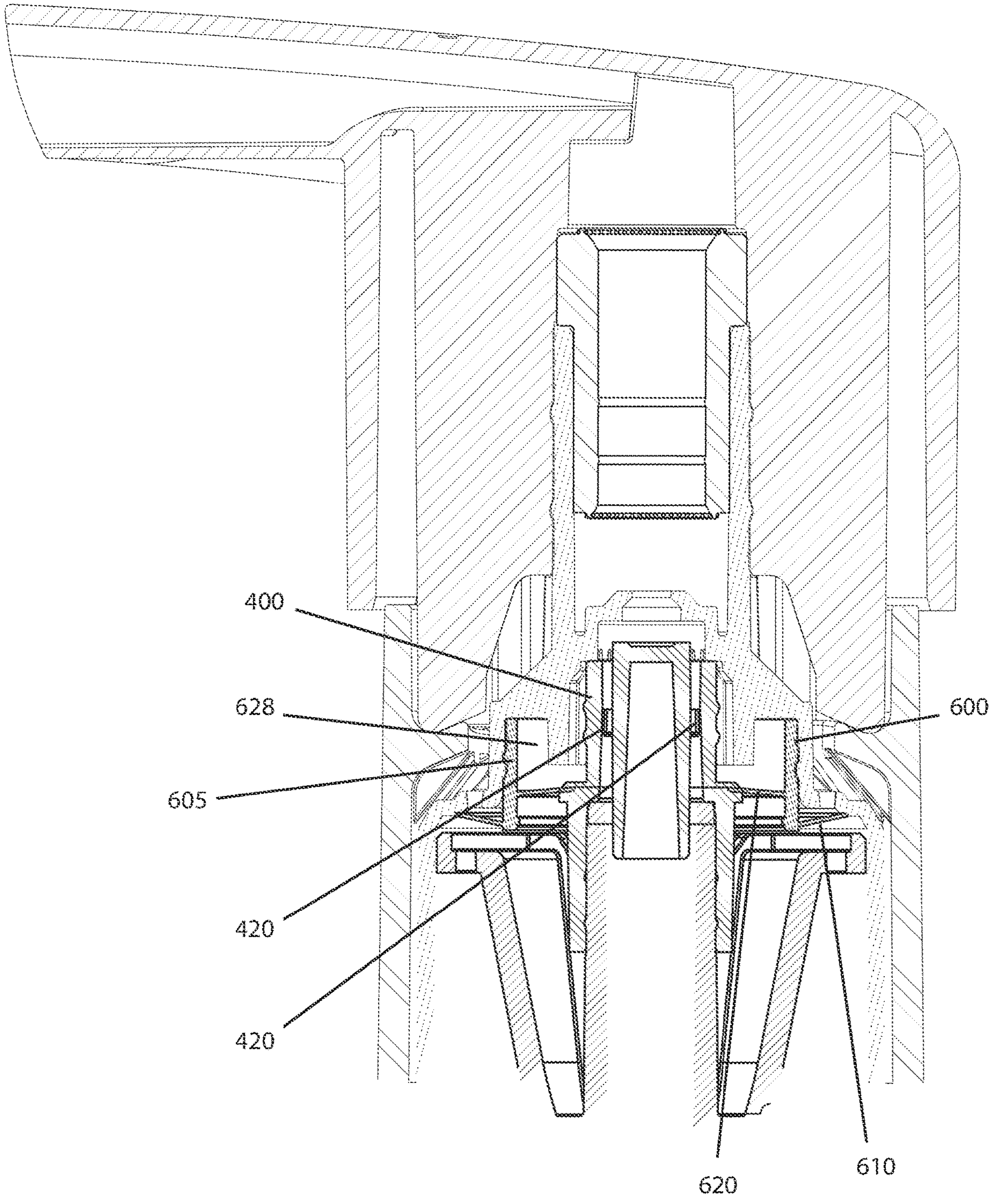
FIG. 10 illustrates an alternate cross-sectional view of the foam dispenser assembly illustrated in FIG. 1.

An alternate view of the assembly illustrated in FIG. 1 is illustrated in FIG. 10. As liquid flows through the restrictor 400, it is mixed with air flowing from the air chamber 128, through the air outlets 328 in the flange 335 of the piston rod 300, into the air flow chamber 628, and past the restrictor 400 into the piston constriction area 280. The liquid and air mixture is formed in the air piston constriction area 280.

As the liquid and air mixture is formed in the air piston constriction area 280, the air and liquid are further mixed and forced through one or more openings in the air piston 200 adjacent the air piston constriction area 280 and into an interior space defined by the head connection 245 of the air piston 200.

A mesh holder 420 holding or defining one or more mesh pieces or other foam generating features capable of mixing and causing turbulence in the air/liquid mixture can be positioned in the dispenser head 110. Flow of the air/liquid mixture through the mesh holder 420 and exposure to the mesh or other features held therein helps to further mix the air/liquid stream and generate a foam that is pushed through the dispenser head 110 and out the dispenser opening 112 as a foam product.

Figure 11:
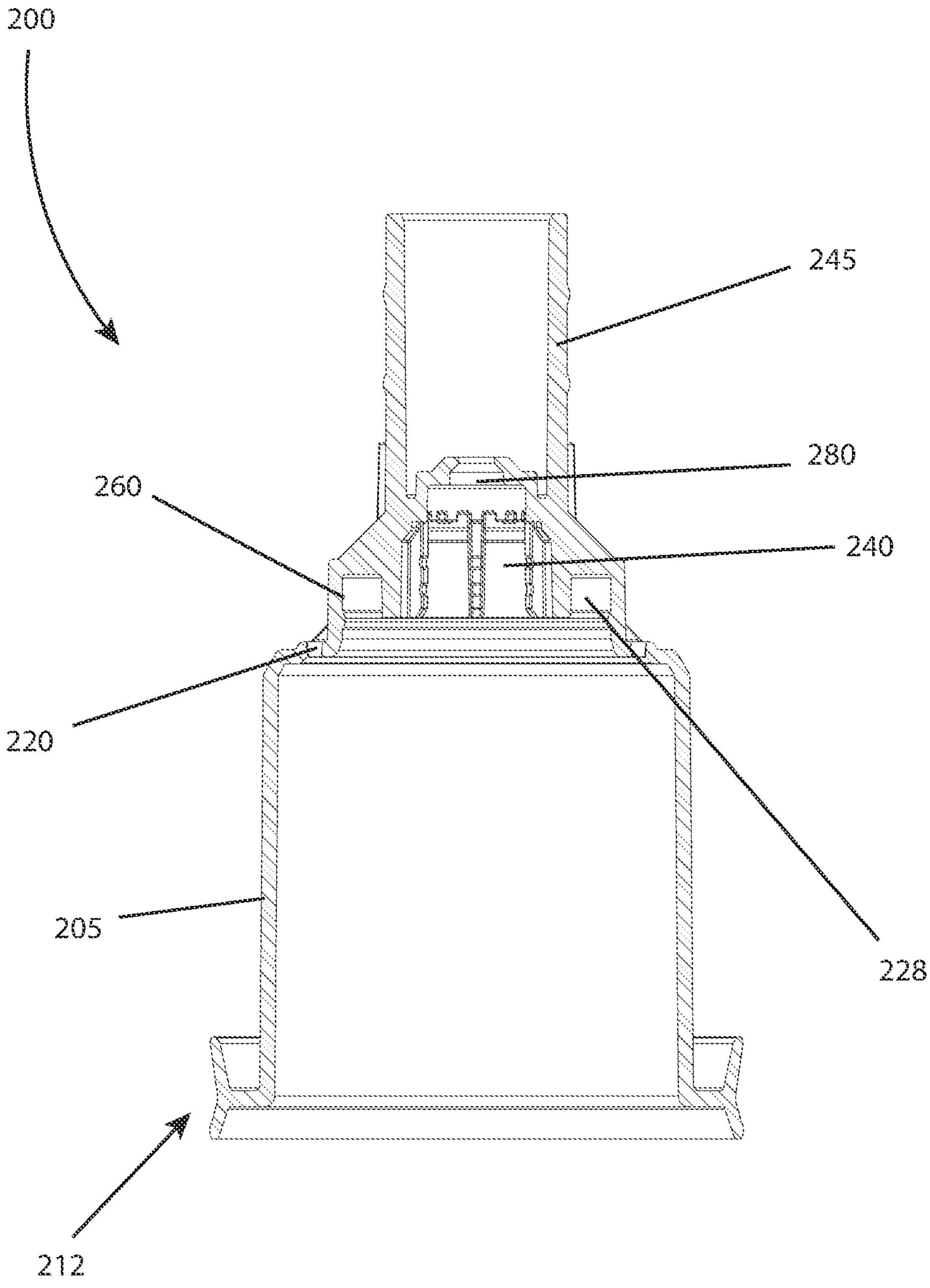
FIG. 11 illustrates a cross-sectional view of an air piston according to various embodiments of the invention.

A cross-sectional view of an air piston 200 according to various embodiments of the invention is illustrated in FIG. 11. As illustrated, an air piston 200 may include an air piston seal 212 configured to engage an inner wall of the accumulator 120 such that a seal is formed between the air piston 200 and the accumulator 120, said seal helping to define the air chamber 128 formed between the air piston 200 and accumulator 120. Actuation of the dispenser head 110 moves the air piston 200 and the air piston seal 212 prevents air within the air chamber 128 from exiting the air chamber 128 adjacent the accumulator 120 walls.

An air piston 200 according to some embodiments of the invention also includes an air piston wall 205 having one or more air inlets 220 formed through the air piston wall 205 such that air may flow from an exterior side of the air piston wall 205 through the one or more air inlets 220 and into an interior side of the air piston wall 205. The one or more air inlets 205 allow air to flow back into the air chamber 128 following the actuation of the dispenser head 110. Upon release of a force on the dispenser head 110, the spring 430 acts on the piston rod 300, returning the piston rod 300 to a rest state. As the piston rod 300 moves back to the rest state, the piston rod 300 engages the air piston 200, moving the air piston 200 relative to the accumulator 120. The movement of the air piston 200 creates a vacuum, sucking air from atmosphere through gaps or space between the dispenser head 110 and the closure 160, past the air valve 600, through the one or more air inlets 220 and into the air chamber 128.

An air piston 200 according to embodiments of the invention may also include an air flow chamber space 228 which helps define the air flow chamber 628 of the assembled foam dispenser 100. An air piston 200 also includes a restrictor seat 240 into which a restrictor 400 may be assembled or seated in the final foam dispenser 100 assembly. The restrictor seat 240 may be adjacent to an air piston constriction 280. A head connection 245 may also be used to attach the air piston 200 to the dispenser head 110. The head connection 245 may include one or more connection features such as flanges, beads, snap connections, or other configurations used to friction fit or otherwise connect the air piston 200 to the dispenser head 110 such that movement of the dispenser head 110 translates to movement of the air piston 200. An air valve seat 260 may also be provided to hold an air valve 600 in an assembled configuration.

According to certain embodiments of the invention, an air flow chamber 628 may be defined by one or more surfaces of the piston rod 300, the restrictor 400 and the air piston 200. The air valve 600 may also assist or contribute to the definition of the space forming an air flow chamber 628. For example, as illustrated in FIG. 10, the air flow chamber 628 is defined by an outer surface of the piston rod 300, an outer surface of the restrictor 400, and a portion of the inner surface of the air piston 200 located above the piston rod 300 and as further defined by the air valve 600 seated in the air piston 200. The air flow chamber 628 includes an air outlet flange 620 and is open to an interior of the restrictor 400 through the one or more restrictor air inlets 420. Air flowing from the air chamber 128, through the air outlets 328 in the piston rod 300 enters the air flow chamber 628. Air pressure in the air flow chamber 628 moves the air outlet flange 620 of the air valve 600, unseating the air outlet flange 620 from contact with the restrictor 400. This allows air to flow through the air flow chamber 628 and into the one or more restrictor air inlets 420 to combine with liquid flowing therein. Upon a release of air pressure in the air flow chamber 628—for example due to the release of force on the dispenser head 110 and a counteracting or return force on the piston rod 300 by the spring 430—the air outlet flange 620 may reseat and seal against a portion of the restrictor 400.

Figure 12:
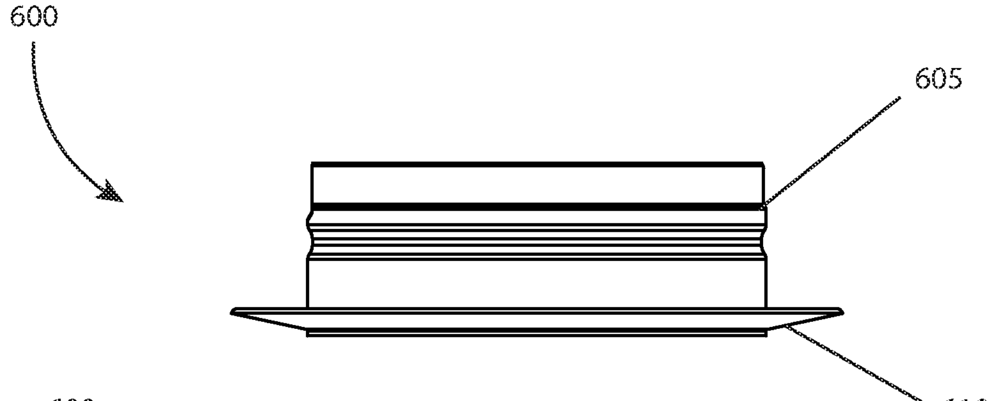
FIG. 12 illustrates an air valve according to various embodiments of the invention.
Figure 13:
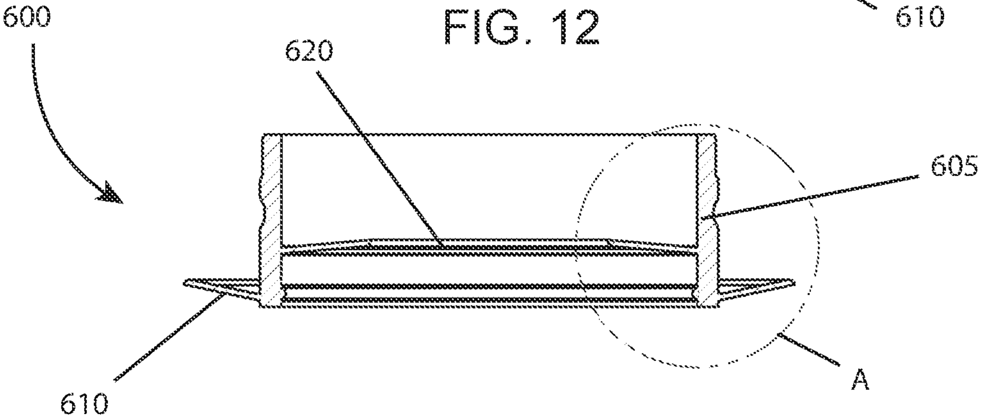
FIG. 13 illustrates a cross-sectional view of an air valve according to various embodiments of the invention.
Figure 14:
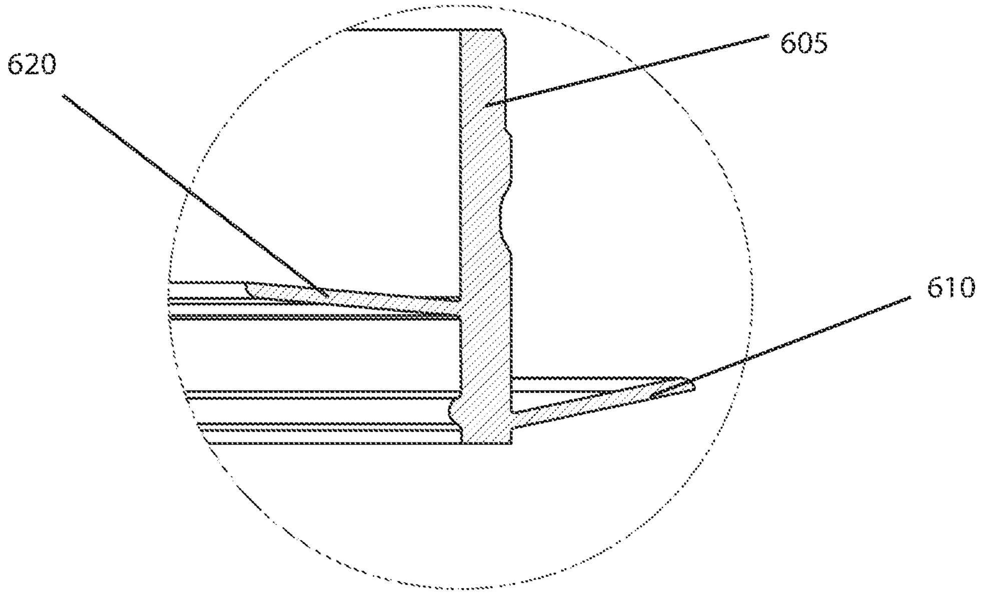
FIG. 14 illustrates a blown-up view of the Section A portion of the air valve illustrated in FIG. 13.

An air valve 600 according to various embodiments of the invention is illustrated in FIGS. 12 through 14. As illustrated in FIG. 12, an air valve 600 may include a wall 605 having an air inlet flange 610 extending off an outer surface of the wall 605. One or more connection features—such as beads, friction fit grooves, or other features—may be included in the wall 605 of the air valve to facilitate positioning and seating of the air valve 600 against a portion of the air piston 200. For example, the features may facilitate assembly of an air valve 600 into the air valve seat 260 of the air piston 200. The air inlet flange 610 may seat over and seal an interior portion of the air inlet 220 of the air piston 200. The air inlet flange 610 prevents air from escaping or flowing out of the air piston chamber 128 when the foam dispenser 100 is at rest or being actuated. Upon a return stroke, when the spring 430 is acting on the piston rod 300 to return the piston rod 300 to a non-actuated state, a vacuum in the air chamber 128 opens or lifts the air inlet flange 610 off its seat against the air piston 200, allowing air from atmosphere to flow through the one or more air inlets 220 into the air chamber 128.

The cross-sectional view of the air valve 600 illustrated in FIGS. 13 and 14 show the air inlet flange 610 and air outlet flange 620 in more detail. The air outlet flange 620 extends off an interior surface of the wall 605. When the air valve 600 is assembled with the other components of the foam dispenser 100 as illustrated in FIGS. 1 and 10, the air outlet flange 620 seats against a portion of the restrictor 400. Upon actuation of the dispenser head 110, air pressure unseats the air outlet flange 620, allowing air to pass from the air chamber 128 into the restrictor 400 through the one or more restrictor air inlets 420.

Figure 15:
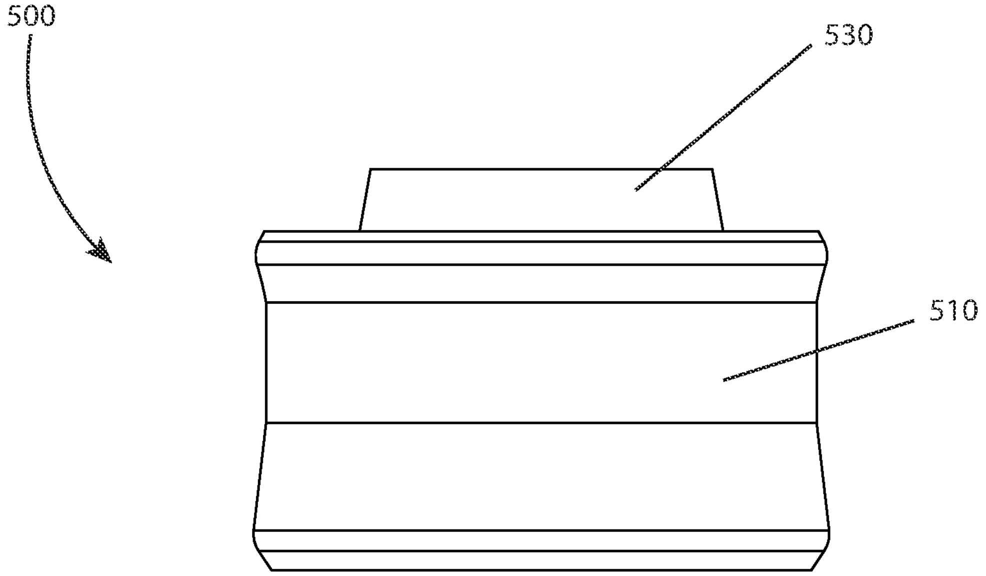
FIG. 15 illustrates a side view of a liquid piston according to various embodiments of the invention.
Figure 16:
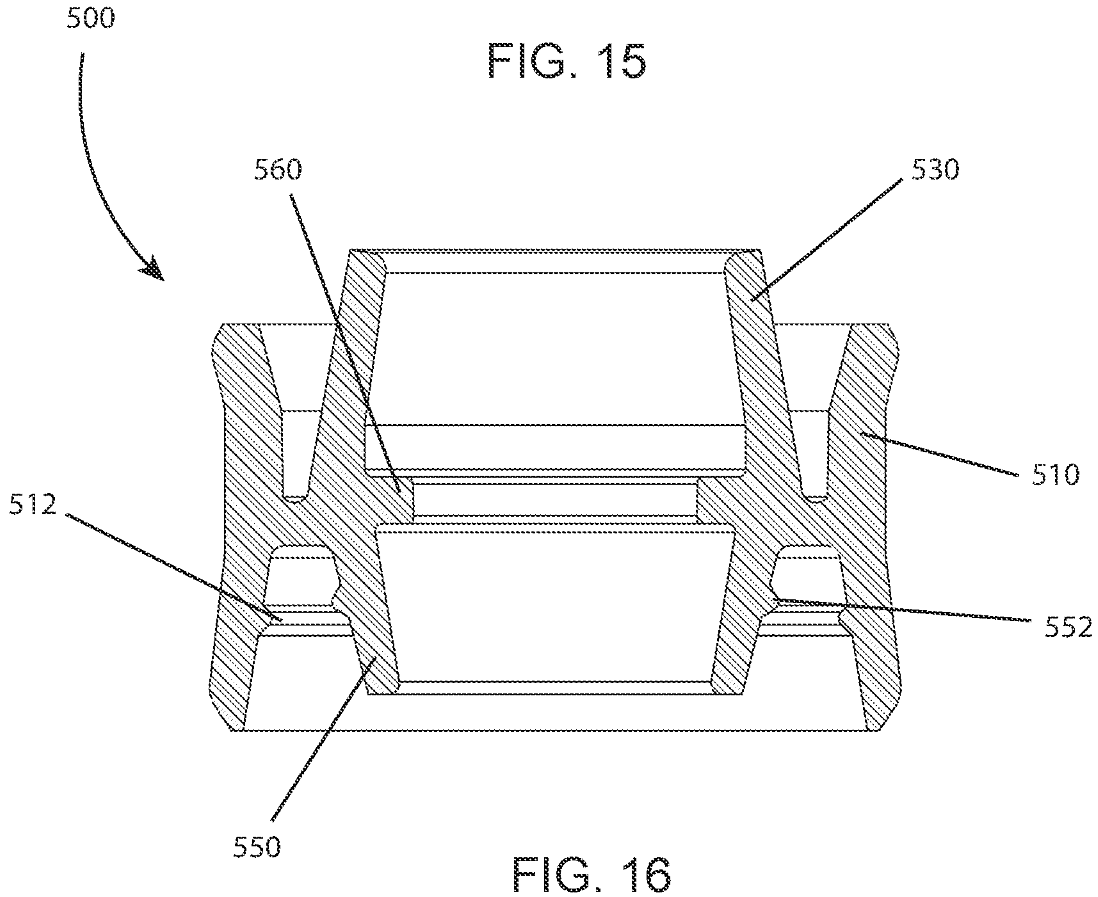
FIG. 16 illustrates a cross-sectional view of the liquid piston illustrated in FIG. 15.

A liquid piston 500 according to various embodiments of the invention is illustrated in FIGS. 15 and 16. A liquid piston 500 may be assembled to a piston rod 300 to facilitate the opening and closing of the liquid opening 312 of the piston rod 300 to allow liquid to flow into the liquid flow path 340 of the piston rod 300.

A liquid piston 500 according to some embodiments of the invention includes three different chevrons. An exterior chevron 510 forms the outer surface or wall of the liquid piston 500 as illustrated. A flange extending inward from an interior surface of the exterior chevron 510 forms a central seal 560 that may engage with a portion of the liquid intake 210 end of a piston rod 300. In a rest state—or non-actuated state—the central seal 560 prevents liquid from flowing into the liquid opening 312 in a piston rod 300. An upper chevron 530 extends upwardly and away from the central seal 560. A lower chevron 550 extends downwardly from the central seal 560 in a direction opposite that of the upper chevron 530 as illustrated in FIG. 16.

When assembled to a piston rod 300 and the other components of a foam dispenser 100, an exterior surface of the exterior chevron 510 seals against the interior walls of the liquid chamber 126 of the foam dispenser 100. Actuation of the dispenser head 110 move the liquid piston within the liquid chamber 126 and portions of the exterior surface of the exterior chevron 510 maintain contact with the walls of the liquid chamber 126, preventing liquid from passing between the walls of the liquid chamber 126 and the exterior chevron 510.

The upper chevron 530 and lower chevron 550 engage surfaces of the piston rod 300 when assembled and during operation of the foam dispenser 100. In a rest state, the lower chevron 550 engages the walls of the liquid intake end 310 of the piston rod 300. The upper chevron 530 engages the piston rod 300. Upon actuation of the dispenser head 110, the lower chevron 550 moves and is unseated from the liquid intake end 310 of the piston rod 300. Such movement also unseats the central seal 560 from the liquid intake end 310, forming a liquid flow path from the liquid chamber 126, past the lower chevron 550, and into the liquid opening 312 of the piston rod 300. During movement of the liquid piston 500, the upper chevron 530 continues to engage the walls of the piston rod 300 such that fluid flowing from the liquid chamber 126 into the liquid opening 312 cannot also flow past the upper chevron 530 into the air chamber 128. In this manner, the liquid piston 500 allows liquid to flow from the liquid chamber 126 and into the liquid flow path 340 of the piston rod 300 during operation.

During the return stroke of the foam dispenser 100, or when the force on the dispenser head 110 is released and the sprint 430 acts to return the foam dispenser 100 to a rest state, the liquid piston 500 reseats itself, preventing liquid flow from the liquid chamber 126 into the liquid flow path 340 of the piston rod 300.

According to certain embodiments of the invention, a liquid piston 500 may also include one or more puller beads formed on portions of the liquid piston 500. For example, as illustrated in FIG. 16, a liquid piston 500 may include a primary puller bead 512 formed on an interior surface of the exterior chevron 510. A secondary puller bead 552 is formed on an exterior surface of the lower chevron 550 as illustrated. The one or more puller beads may facilitate the ejection of a liquid piston 500 from a mold during the manufacturing process.

According to certain embodiments of the invention, a foam dispenser 100 utilizing a plastic or resin c-spring style spring 430 includes an accumulator spring cone 130 and a piston rod spring cone 330 having the same slope angle. For example, according to some preferred embodiments of the invention, the angle of slope of the accumulator spring cone 130 and the piston rod spring cone 330 is between 10 degrees and 12 degrees. More preferably, both spring cones include a slope of 11 degrees. In other embodiments, the slope of the accumulator spring cone 130 and piston rod spring cone 330 may be different or may vary by one or two degrees. In still other embodiments, a spring cone may include a changing slope such that the slope engaged with the spring changes over the stroke of the foam dispenser 100 or over the actuation of the spring 430.

According to various embodiments of the invention, components of the foam dispenser 100 may be made of a single plastic material. In other embodiments, multiple plastic grades or materials may be used but those used are capable of being recycled in the same recycling stream or processes such that the entire foam dispenser 100 may be recycled in common recycling processes. In some embodiments, the container 900 used with the foam dispenser 100 may also be recycled in the same recycling stream or using the same recycling process as the other components of the foam dispenser 100 such that a user need not separate the container 900 from the foam dispenser 100 to facilitate recycling.

According to various embodiments of the invention, a foam dispenser 100 according to embodiments of the invention may be connected to a container 900 containing a liquid product to be foamed. For example, the liquid product may include a soap, a disinfectant, a cleaning solution, a disinfecting solution, a fragrance solution, or any other liquid which is desired to be foamed for use.

Having thus described certain embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A foam dispenser, comprising:

an accumulator, comprising:
- a liquid chamber;
- an air chamber; and
- an accumulator spring cone;

an air piston, comprising:
- an air piston wall;
- an air piston seal seated against an interior wall of the air chamber;
- at least one air inlet through the air piston wall;
- a restrictor seat;
- an air valve seat;
- an air piston constriction; and a head connection extending from the air piston constriction away from the air chamber;

a piston rod, comprising:

a fluid intake end positioned in a portion of the liquid chamber;

a fluid opening in the fluid intake end;

a fluid output end opposite the fluid intake end, comprising:

a piston rod spring cone;

a flange extending outward of the piston rod spring cone and sealed against an interior wall of the air piston; and at least one air passage through the flange;

a fluid flow path on an interior of the piston rod between the fluid intake end and the fluid output end;

a liquid piston attached to the fluid intake end of the piston rod and seated in the liquid chamber, comprising:

an exterior chevron;

a central seal flange extending off an internal surface of the exterior chevron;

an upper chevron extending off of the central seal; and a lower chevron extending off the central seal in a direction opposite the upper chevron;

a spring seated between the piston rod spring cone and the accumulator spring cone;

a restrictor seated in the restrictor seat and connected to the piston rod, comprising:

at least one restrictor liquid inlet in communication with the fluid flow path; and at least one restrictor liquid outlet in communication with the at least one restrictor liquid inlets;

an air valve seated in the air valve seat, comprising:

a wall;

an air inlet flange extending off an exterior surface of the wall; and an air outlet flange extending off an interior surface of the wall;

a dispenser head connected to the head connection; and a mesh holder seated in the dispenser head.

2. The foam dispenser of claim 1, further comprising a closure attached to the accumulator.

3. The foam dispenser of claim 2, further comprising a container attached to the closure.

4. The foam dispenser of claim 3, further comprising a liquid product in the container.

5. The foam dispenser of claim 1, wherein the spring comprises a plastic spring.

6. The foam dispenser of claim 1, wherein the spring comprises a plastic compression spring.

7. The foam dispenser of claim 1, wherein the air inlet flange seats over each of the at least one air inlets of the air piston and the air outlet flange engages the restrictor.

8. The foam dispenser of claim 7, wherein the air inlet flange prevents the flow of air from the air chamber through the each of the at least one air inlets during actuation of the dispenser head.

9. The foam dispenser of claim 7, wherein the air outlet at least partially disengages from the restrictor during actuation of the dispenser head.

10. The foam dispenser of claim 1, wherein the accumulator spring cone has a slope of between 10 to 12 degrees.

11. The foam dispenser of claim 1, wherein the piston rod spring cone has a slope of between 10 to 12 degrees.

12. The foam dispenser of claim 1, wherein the accumulator spring cone has a slope of about 11 degrees.

13. The foam dispenser of claim 1, wherein the piston rod spring cone has a slope of about 11 degrees.

14. The foam dispenser of claim 1, wherein the slope of the accumulator spring cone and the slope of the piston rod spring cone are the same.

15. The foam dispenser of claim 1, wherein the slope of the accumulator spring cone and the slope of the piston rod spring cone are different.

16. A foam dispenser, comprising:

an accumulator, comprising:

a liquid chamber;

an air chamber; and an accumulator spring cone having a slope of between 10 and 12 degrees;

an air piston, comprising:

an air piston wall;

an air piston seal seated against an interior wall of the air chamber;

at least one air inlet through the air piston wall;

a restrictor seat;

an air valve seat;

an air piston constriction adjacent to the restrictor seat; and a head connection extending from the air piston constriction away from the air chamber;

a piston rod, comprising:

a fluid intake end positioned in a portion of the liquid chamber;

a fluid opening in the fluid intake end;

a fluid output end opposite the fluid intake end, comprising:

a piston rod spring cone having a slope of between 10 and 12 degrees;

a flange extending outward of the piston rod spring cone and sealed against an interior wall of the air piston; and at least one air passage through the flange;

a fluid flow path on an interior of the piston rod between the fluid intake end and the fluid output end;

a liquid piston attached to the fluid intake end of the piston rod and seated in the liquid chamber, comprising:

an exterior chevron;

a central seal flange extending off an internal surface of the exterior chevron;

an upper chevron extending off of the central seal; and a lower chevron extending off the central seal in a direction opposite the upper chevron;

a spring seated between the piston rod spring cone and the accumulator spring cone;

a restrictor seated in the restrictor seat and connected to the piston rod, comprising:

at least one restrictor liquid inlet in communication with the fluid flow path; and at least one restrictor liquid outlet in communication with the at least one restrictor liquid inlet;

an air valve seated in the air valve seat, comprising:

a wall;

an air inlet flange extending off an exterior surface of the wall and seated over the at least one air inlet of the air piston; and an air outlet flange extending off an interior surface of the wall and seated against an exterior wall of the restrictor;

a dispenser head connected to the head connection.

17. The foam dispenser of claim 16, further comprising:

a closure connected to the accumulator;

a container connected to the closure;

a liquid in the container; and at least one foam generating feature seated in the dispenser head.

18. A foam dispensing system, comprising:
a container;
a fluid contained within the container;
a foam dispenser attached to the container, the foam dispenser comprising:
an accumulator, comprising:
a liquid chamber;
an air chamber; and
an accumulator spring cone having a slope of between 10 and 12 degrees;
an air piston, comprising:
an air piston wall;
an air piston seal seated against an interior wall of the air chamber;
at least one air inlet through the air piston wall;
a restrictor seat;
an air valve seat;
an air piston constriction adjacent to the restrictor seat; and
a head connection extending from the air piston constriction away from the air chamber;
a piston rod, comprising:
a fluid intake end positioned in a portion of the liquid chamber;
a fluid opening in the fluid intake end;
a fluid output end opposite the fluid intake end, comprising:
a piston rod spring cone having a slope of between 10 and 12 degrees;
a flange extending outward of the piston rod spring cone and sealed against an interior wall of the air piston; and
at least one air passage through the flange;
a fluid flow path on an interior of the piston rod between the fluid intake end and the fluid output end;
a liquid piston attached to the fluid intake end of the piston rod and seated in the fluid chamber, comprising:
an exterior chevron;
a central seal flange extending off an internal surface of the exterior chevron;
an upper chevron extending off of the central seal; and
a lower chevron extending off the central seal in a direction opposite the upper chevron;
a spring seated between the piston rod spring cone and the accumulator spring cone;
a restrictor seated in the restrictor seat and connected to the piston rod, comprising:
at least one restrictor liquid inlet in communication with the fluid flow path; and
at least one restrictor liquid outlet in communication with the at least one restrictor liquid inlets;
an air valve seated in the air valve seat, comprising:
a wall;
an air inlet flange extending off an exterior surface of the wall and seated over the at least one air inlet of the air piston; and
an air outlet flange extending off an interior surface of the wall and seated against an exterior wall of the restrictor;
a dispenser head connected to the head connection.

* * * * *